Nov. 21, 1950 P. M. ENRIGHT 2,530,951
OBSTRUCTION CLEARING DEVICE FOR SUCTION DREDGES
Filed Sept. 6, 1947 2 Sheets-Sheet 2
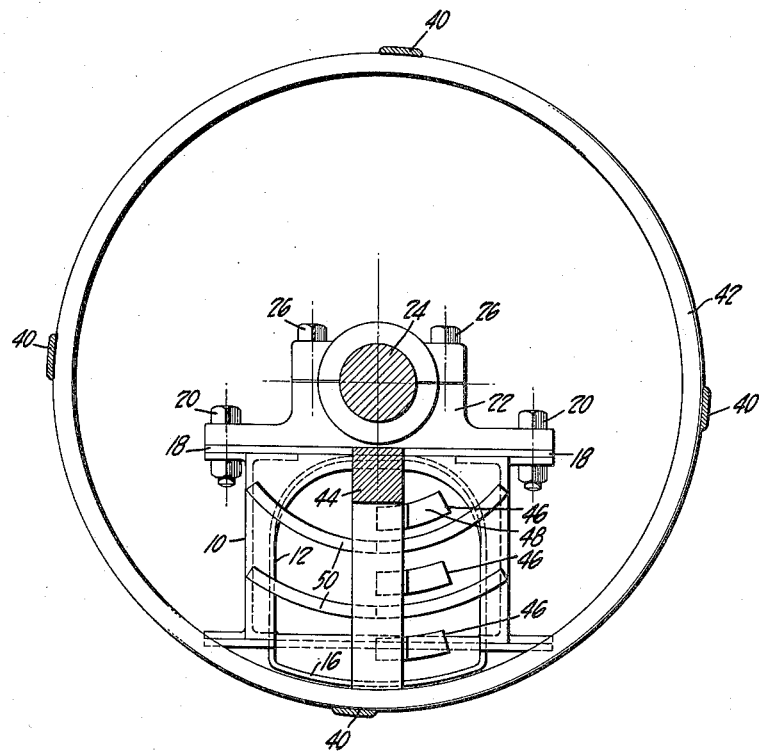
FIG_3_
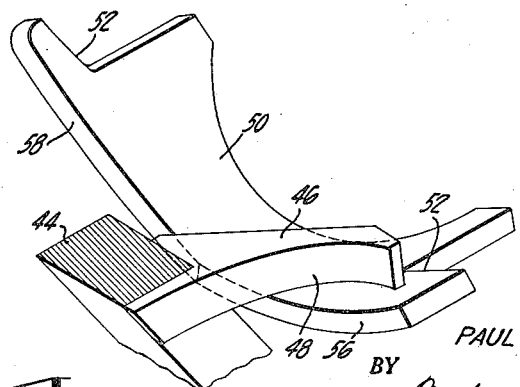
FIG_4_
INVENTOR.
PAUL M. ENRIGHT
BY Naylor and Lassagne
ATTORNEYS Patented Nov. 21, 1950

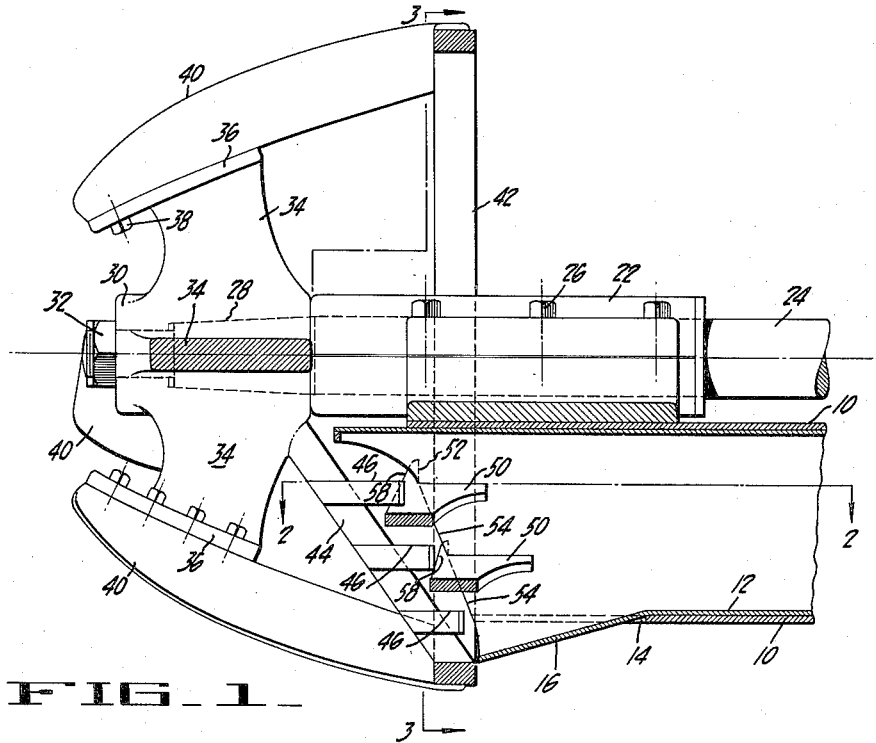

2,530,951

UNITED STATES PATENT OFFICE 2,530,951

OBSTRUCTION CLEARING DEVICE FOR SUCTION DREDGES

Paul M. Enright, Oakland, Calif., assignor to Hydraulic Dredging Company, Ltd., Oakland, Calif., a corporation of Delaware Application September 6, 1947, Serial No. 772,543

7 Claims. (Cl. 37—67)

The present invention relates to hydraulic dredges of the cutter-head hydraulic pipe-line type, and in particular to a construction whereby the suction intake of a dredge of this type will be kept free of obstructions.

Hydraulic dredges of the type to which the present invention relates comprise, essentially, a hull on which there is mounted a pump, a ladder, and winding gear for controllably moving a suction intake carried by the ladder over the material to be excavated. For the purpose of cutting loose the material to be excavated there is also mounted adjacent the suction intake a power operated cutter provided with a series of blades capable of being brought into contact with the material to be excavated by movement of the ladder.

In the dredging of rivers and harbors, natural formations ranging from silt or soft mud to boulders of a size incapable of passing through the pump are encountered, as well as a variety of artificial obstructions such as is found in dredging operations in an area previously used as a dump.

In order to avoid clogging or pump damage by such rocks and other obstructions, it has been usual to employ screening arrangements of various types at the suction intake. Simple screening devices in the form of bars or the like disposed at the suction intake, while serving to protect the pump, are themselves easily clogged by rocks and other obstructions, and this has led to many efforts to devise screening arrangements whereby material prevented from entering the suction intake will also be cleared away from the mouth thereof.

Previously devised obstruction clearing devices of this kind, however, have been designed on principles involving either substantial losses in digging performance by virtue of the continuous presence of the clearing members in the suction intake, or, when the clearing devices have been moved across the suction intake at intervals so as to minimize such losses, have been subject to jamming and breakage by obstructions wedging in the intake in the intervals between the passages of the clearing devices.

It is an object of the present invention to provide a suction intake screen and a screen clearing device which will effectively remove obstructions wedging in a suction intake screen.

It is a further object of the invention to provide a screen clearing device of this kind which will avoid the substantial losses in digging performance arising from obstruction of the suction intake by the clearing members.

According to the principle of the present invention screening elements are arranged so as to block obstructions while permitting the free sweep of clearing devices which extend inwardly of the suction intake beyond the outermost parts of the screening elements and act both to cam outwardly and sweep aside such obstructions, even though they may be wedged between two screening elements or between a screening element and an edge of the intake. In order to avoid obstruction of the suction intake by the clearing devices, it is preferable to employ only a single radially arranged clearing device assembly which will sweep between the screening elements during a small fraction of each cycle of rotation of the cutter, leaving the suction intake unobstructed by such clearing devices during the remainder of the cycle.

In adapting this principle to the embodiment of the invention, I preferably affix one or more relatively thin arcuate ribs across the mouthpiece of the suction pipe to subdivide the area defined by the mouthpiece into a plurality of arcuate areal segments of substantially equal width, said ribs being preferably parallel to each other and concentric with respect to the axis of rotation of clearing fingers preferably carried by the cutter head. Rotatable with the cutter head is a plurality of spaced fingers adapted during each rotation of the cutter head to sweep between the arcuate ribs carried by the mouthpiece of the suction pipe, said fingers being provided with a cammed rock-contacting surface adapted to force outwardly from said ribs any rocks wedged therebetween.

Other objects and advantages of the invention will be apparent from the following description taken in conjunction with the drawings forming part of this specification, and in which:

Figure 1 is a sectional view in side elevation of the cutter head and suction pipe structure embodying the invention;

Figure 2 is a view in section taken along lines 2—2 of Figure 1;

Figure 3 is a view in section taken along lines 3—3 of Figure 1; and

Figure 4 is a view in perspective of one of the ribs and fingers embodied in the invention.

Referring to the drawings for more specific details of the invention, a digging ladder 10 pivotally carried at the bow of a hydraulic dredge, not shown, is usually made up of two I-beams or two trusses, substantially rectangular in cross-section, and has rigidly supported therein a suction pipe 12, said ladder being clear at the underside to provide an opening 14 for the extension therethrough of the angularly inclined forepart 16 of the underside of the suction pipe 12. The forepart 16 of the pipe is arcuate in form, being concentric with the cutter shaft, hereinafter described, of the digging ladder, and is adapted through its flattended curvature for full contactual engagement with the material being dug. The digging ladder 10 has flanges 18 to which there is usually secured by bolts 20 a journal 22 for the bearing support of a rotatable cutter shaft 24. The upper half of the journal 22, when the journal is a split type, is secured to the lower half by bolts 26.

The end 28 of the shaft 24 as shown is tapered and is provided with a keyway, not shown, for engagement with a key, not shown, carried by a cutter head 30 fitted on the tapered end 28 of the shaft 24. A nut 32 secures the head 30 to the shaft against end-wise movement. This is a conventional type of connection between the shaft and cutter hub, but other systems such as a threaded shaft and hub or a square taper and crosskey are often used. The cutter head 30 has a plurality of radial arms 34 terminating in pads 36 to which there is secured by bolts 38 cutter blades 40. The structure thus far described is conventional, but the structural details may vary.

A ring 42 is secured, as by welding, to the rearward ends of each of the blades, said ring having secured thereto one end of an angularly inclined arm 44 having its opposite end secured to the cutter head 30. At spaced intervals on the arm 44, there is secured a plurality of curved fingers 46 having cam faces 48.

A plurality of arcuate ribs 50, as best shown in Figure 4, having shoulders 52 are fitted within the mouth of the suction pipe 12 until the shoulders 52 abut the angularly inclined leading edge 54 of said pipe, said ribs being then secured in spaced and staggered relation, as shown in Figures 1 and 2, within the mouth of the pipe, as by welding. The ribs are parallel to each other and to the forepart 16 of the underside of the suction pipe 12, and are concentric to the axis of rotation of the cutter shaft 24. The leading edge of each rib is comprised of a straight portion 56 and a portion 58 angularly inclined with respect thereto, said portion 58 being adapted to serve as a cam surface for a purpose hereinafter described.

When the digging ladder 10 is swung into the material and the suction pump and cutter shaft motor, not shown, actuated, the cutter head 30 is rotated to cause the blades 40 to cut or loosen the material, whereupon said material is drawn through the suction pipe. As the cutter head rotates, the arm 44 and fingers 46 rotate therewith to cause the latter to wipe through the arcuate spaces at the mouth of the suction pipe defined by the ribs 50. The width of these arcuate spaces is substantially constant and is of such magnitude that rocks sufficiently large to prevent their passage through the dredge pump will be prevented from entering the mouth of the pipe.

In the process of dredging, rocks become wedged in the spaces between the ribs 50. When this occurs, the cam faces 48 of the fingers 46 are effective to cause a plucking out of the wedged rocks as the fingers wipe between the ribs and walls of the pipe.

In order to augment the camming action of the fingers 46 and to insure that the wedged rocks will not be further wedged between the ribs 50, due perhaps to a reverse camming contour of rocks engaged by the fingers, the cam surfaces 58 are provided. If a portion of a rock is wedged between a pair of the ribs 50 with protruding portions of the rock in engagement with the cam surfaces 58 of the ribs, the rock will be urged outwardly of the ribs by its lateral movement relative to the surfaces 58 under the action of the fingers 46.

While the preferred embodiment of the invention has been shown and described, it is to be understood that the embodiment shown is subject to modification within the spirit of the invention and the scope of the appended claims.

What I claim as new and desire to secure by Letters Patent is:

1. For a hydraulic dredge, or the like, having a suction pipe and a cutter head in spaced relation to the mouth of said pipe, the combination of at least one member carried at the mouth of the suction pipe transversely thereof, said member in conjunction with the wall of the pipe being adapted to divide the areal space of the pipe mouth into a plurality of space segments, and means carried by said cutter head and adapted to sweep within said space segments upon the rotation of said cutter head.

2. For a hydraulic dredge, or the like, having a suction pipe and a rotatable cutter head in spaced relation to the mouth of said pipe, the combination of at least a pair of spaced arcuate members fixed between the mouth of said pipe and said cutter head and concentrically arranged with respect to the axis of rotation of said cutter head, and at least one finger supported by said cutter head and adapted to sweep between the facing surfaces of said arcuate members.

3. For a hydraulic dredge, or the like, having a suction pipe and a rotatable cutter head in spaced relation to the mouth of said pipe, the combination of at least one arcuate rib affixed to and across the mouth of said pipe and concentrically arranged with respect to the axis of rotation of said cutter head, and a plurality of fingers supported by said cutter head and adapted to sweep within the spaces defined by said rib and the mouh of said pipe.

4. For a hydraulic dredge, or he like, having a suction pipe and a rotatable cutter head in spaced relation to the mouth of said pipe, the combination of a grid comprising a plurality of spaced parallel rib members carried at the mouth of said pipe and extending outwardly therefrom, said rib members being concentric to the axis of rotation of said cutter head, and a plurality of finger members supported by said cutter head and rotatable therewith, said finger members being adapted to sweep between said rib members.

5. The combination as set forth in claim 3 wherein the leading faces of said fingers in their direction of travel are provided with cam surfaces adapted upon contact with a rock, or the like, lodged between the rib members to urge said rock outwardly of the pipe mouth and free from engagement with the rib members.

6. The combination as set forth in claim 4 wherein the leading edges of said rib members are provided with cam surfaces adapted to urge material lodged thereagainst outwardly from the pipe mouth as said material is moved laterally by said fingers.

7. The combination as set forth in claim 3 wherein the leading edges of said rib members are provided with cam surfaces adapted to urge material lodged thereagainst outwardly from the pipe mouth as said material is moved laterally with respect to said ribs by said fingers.

PAUL M. ENRIGHT.

REFERENCES CITED

The following references are of record in the file of this patent:

UNITED STATES PATENTS

| Number | Name | Date |
| --- | --- | --- |
| 372,956 | Bowers | Nov. 8, 1887 |
| 775,255 | Sewall et al. | Nov. 15, 1904 |
| 1,999,149 | Durdin, Jr. | Apr. 23, 1935 |